US010681288B2

(12) United States Patent
Huang et al.

(10) Patent No.: US 10,681,288 B2
(45) Date of Patent: Jun. 9, 2020

(54) LIGHT EMITTING CONTROL SYSTEM

(71) Applicant: LITE-ON TECHNOLOGY CORPORATION, Taipei (TW)

(72) Inventors: Jian-Hua Huang, Taipei (TW); Yu-Hung Su, Taipei (TW); Shu-Hua Yang, Taipei (TW); Han-Hsing Peng, Taipei (TW)

(73) Assignee: LITE-ON TECHNOLOGY CORPORATION, Taipei (TW)

( * ) Notice: Subject to any disclaimer, the term of this patent is extended or adjusted under 35 U.S.C. 154(b) by 175 days.

(21) Appl. No.: 15/943,809

(22) Filed: Apr. 3, 2018

(65) Prior Publication Data

US 2018/0376080 A1   Dec. 27, 2018

Related U.S. Application Data

(60) Provisional application No. 62/523,863, filed on Jun. 23, 2017.

(51) Int. Cl.
| | |
|---|---|
| *G01T 1/20* | (2006.01) |
| *H04N 5/33* | (2006.01) |
| *G06K 9/00* | (2006.01) |
| *G02B 27/09* | (2006.01) |
| *G02B 19/00* | (2006.01) |
| *G06K 9/22* | (2006.01) |
| *G06K 9/20* | (2006.01) |
| *G06F 21/32* | (2013.01) |

(52) U.S. Cl.
CPC ............. *H04N 5/33* (2013.01); *G02B 19/009* (2013.01); *G02B 19/0023* (2013.01); *G02B 19/0047* (2013.01); *G02B 27/0955* (2013.01); *G06K 9/00604* (2013.01); *G06K 9/209* (2013.01); *G06K 9/2018* (2013.01); *G06K 9/22* (2013.01); *B60R 2300/103* (2013.01); *G06F 21/32* (2013.01)

(58) Field of Classification Search
CPC ...... H04N 5/33; H04N 5/2254; H04N 5/2256; G02B 19/0023; G02B 19/0047; G02B 19/009; G02B 27/0955; G02B 17/08; G06K 9/22; G06K 9/209; G06K 9/2018; G06K 9/00604; G03B 15/02; G06F 21/32
See application file for complete search history.

(56) References Cited

U.S. PATENT DOCUMENTS

| | | | | |
|---|---|---|---|---|
| 2010/0220490 | A1* | 9/2010 | Bushell ................... | B60Q 1/14 362/520 |
| 2015/0278499 | A1* | 10/2015 | Levitov .................. | G06F 21/32 726/19 |

FOREIGN PATENT DOCUMENTS

JP    2006025954 A  *  2/2006

* cited by examiner

*Primary Examiner* — Kiho Kim
(74) *Attorney, Agent, or Firm* — McClure, Qualey & Rodack, LLP

(57) ABSTRACT

A light emitting control system is provided. The light emitting control system includes a housing, an IR emitter having a central axis and a lens structure. The housing has a receiving space, and the IR emitter is disposed in the receiving space of the housing. The lens structure is disposed on the reflector, the lens structure includes a lens facing the IR emitter, and a cross-sectional shape of the lens along a first cross-sectional line is asymmetric with respect to the central axis of the IR emitter.

19 Claims, 14 Drawing Sheets

LIGHT EMITTING CONTROL SYSTEM

This application claims the benefit of U.S. provisional application Ser. No. 62/523,863, filed Jun. 23, 2017, the subject matter of which is incorporated herein by reference.

BACKGROUND

Technical Field

The present disclosure relates in general to a light emitting control system involving IRIS recognition, and more particularly to a light emitting control system involving IRIS recognition for off-axis design.

Description of the Related Art

With the developments of technology of mobile devices, additional functional requirements with components for realizing such applications to be equipped in the mobile devices have increasingly progressed, such as reduction of sizes and thicknesses of mobile devices, improved image capturing performances, IRIS recognition, and etc.

SUMMARY OF THE INVENTION

The present disclosure is directed to a light emitting control system. According to the embodiments of the present disclosure, with the asymmetric design of the housing and the lens provided by the present disclosure, a relatively narrow half angle (view angle) of about ±13° with a tilted beam angle of about 8° can achieved, a relative high radiant intensity with high light utilization can be obtained, and drawbacks of low radiant intensity and half energy being wasted can be prevented.

According to an embodiment of the present disclosure, a light emitting control system is provided. The light emitting control system includes a housing, an IR emitter and a lens structure. The housing has a receiving space. The IR emitter has a central axis and is disposed in the receiving space of the housing. The lens structure is disposed on the housing. The lens structure includes a lens facing the IR emitter, and a cross-sectional shape of the lens along a first cross-sectional line is asymmetric with respect to the central axis of the IR emitter.

According to another embodiment of the present disclosure, an image recognition camera including a light emitting control system as aforementioned is provided.

According to a further embodiment of the present disclosure, a mobile terminal including an image recognition camera as aforementioned is provided.

The disclosure will become apparent from the following detailed description of the preferred but non-limiting embodiments. The following description is made with reference to the accompanying drawings.

DETAILED DESCRIPTION OF THE INVENTION

Figure 1:
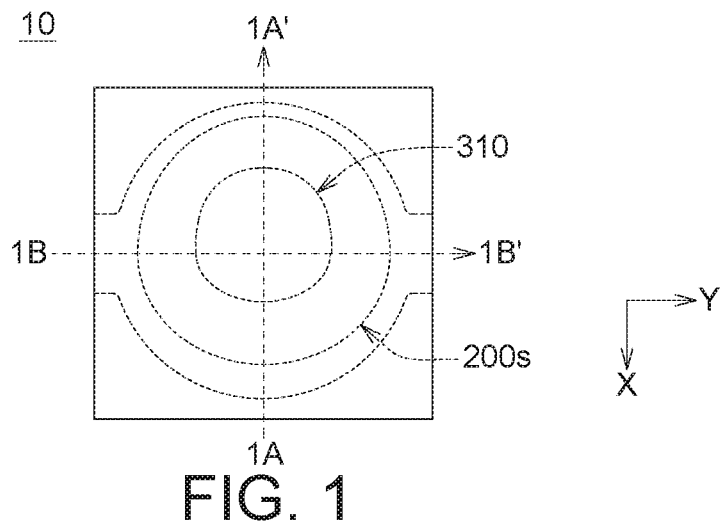
FIG. 1 shows a top view of a light emitting control system according to an embodiment of the present disclosure.

According to the embodiments of the present disclosure, a light emitting control system is provided. The embodiments are described in details with reference to the accompanying drawings. The details of the embodiments are for exemplification only, not for limiting the scope of protection of the disclosure. Moreover, the identical or similar elements of the embodiments are designated with the same reference numerals. Also, it is also important to point out that the illustrations may not be necessarily be drawn to scale, and that there may be other embodiments of the present disclosure which are not specifically illustrated. Thus, the specification and the drawings are to be regarded as an illustrative sense rather than a restrictive sense. It is to be noted that the drawings are simplified for clearly describing the embodiments, and the details of the structures are for exemplification only, not for limiting the scope of protection of the disclosure. Ones having ordinary skills in the art may modify or change the structures according to the embodiments of the present disclosure.

IR is preferably used as the lighting source and accordingly IR images are used for feature extraction and match for IRIS recognition for the following reasons. First, in terms of CMOS sensitivity, an IR light with a wavelength of about at least 810 nm or higher than 810 nm is provided with relatively high sensitivity to a CMOS sensor while an IR light of a wavelength being higher than 780 nm is invisible to human eyes, such that aversion reactions of human eyes to visible lights, such as head jerking, changes of pupil size, eyes movements, and etc., can be prevented. In addition, among the eye colors worldwide, melanin distribution dominates, and IRIS recognition using IR images works best on dark/brown eyes and works nicely on blue/green eyes as well. Among the IRIS recognition techniques, an off-axis design using a light pattern tilted IR emitter is preferred.

A process of an optical image recognition using infrared as the lighting source may include the following steps. First, an IR emitter is used as a lighting source to provide IR lights onto a human face, and then a camera (infrared camera) takes an infrared photo of the human face. Then, the IR photo is received by such as a processor, the feature data of the taken IR photo are extracted (feature extraction) and compared with the feature data of an infrared image stored in the image model database. Specifically, the IRIS patterns of the taken IR photo and of the stored IR image are compared. Next, after the comparison, a decision is made according to the results of the comparison of the feature data match. Two outcomes are possible; one is "match found (identity and details)", and the other is "match not found (less of image score)". In the "match found" case, the recognition passes, and then the device (such as a cell phone) is turned on. In the "match not found" case, since the recognition fails, the device is not turned on.

Figure 1A:
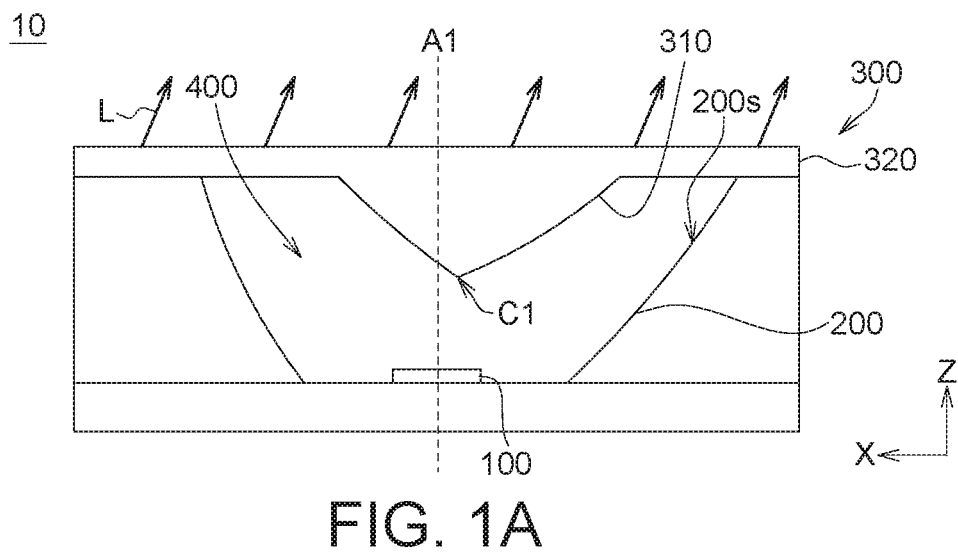
FIG. 1A shows a cross-sectional view along a first cross-sectional line 1A-1A' in FIG. 1.
Figure 1B:
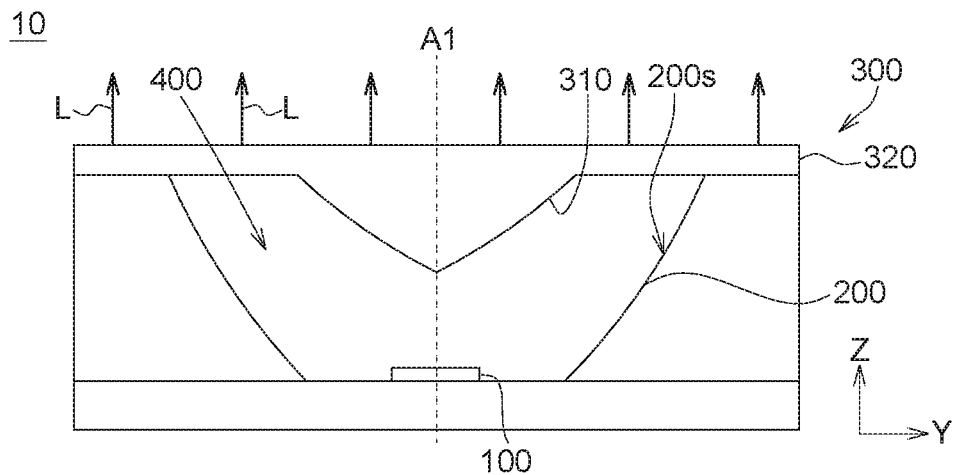
FIG. 1B shows a cross-sectional view along a second cross-sectional line 1B-1B' in FIG. 1.
Figure 1C:
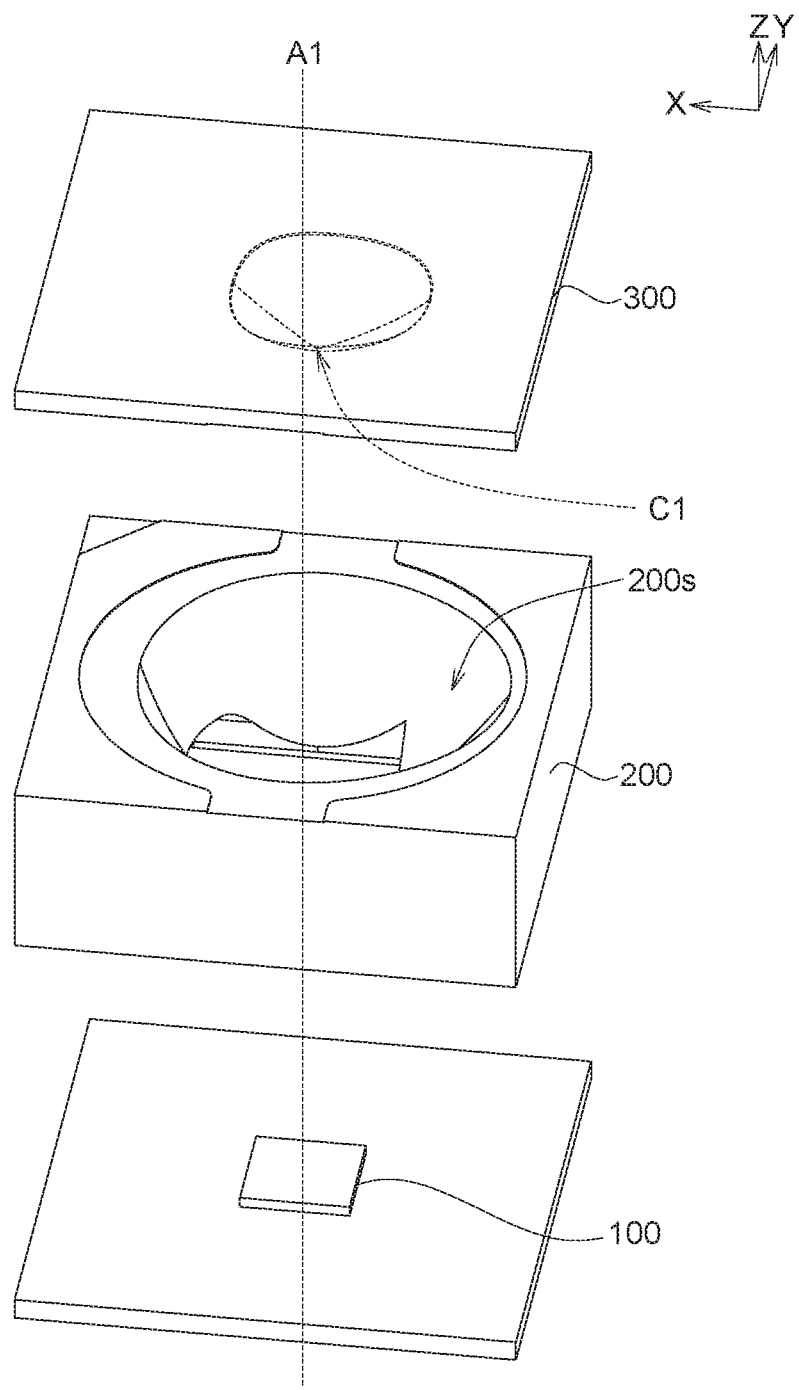
FIGS. 1C-1D show 3D explosion diagrams of a light emitting control system as viewed from different perspectives according to an embodiment of the present disclosure.
Figure 1D:
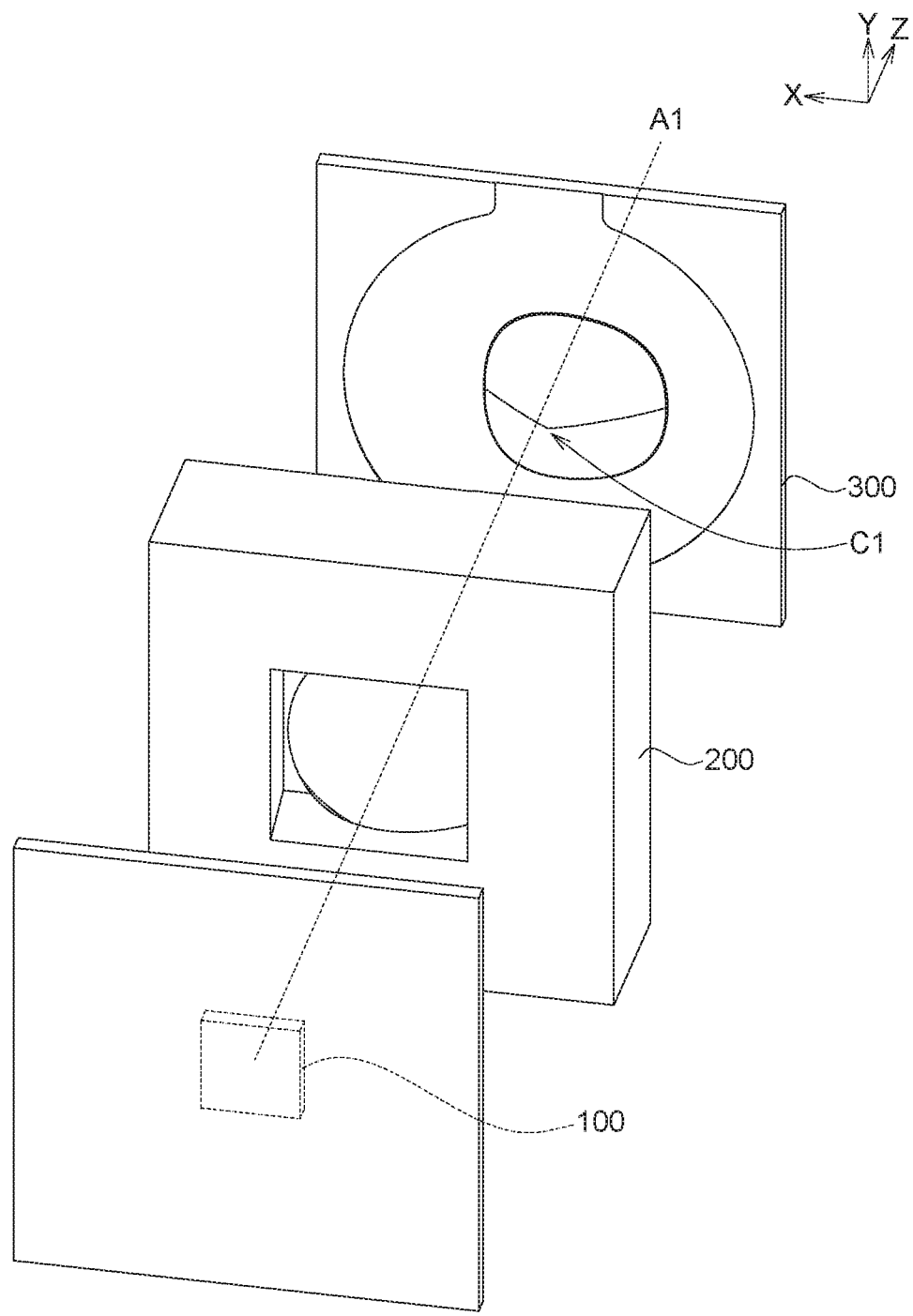
Figure 2A:
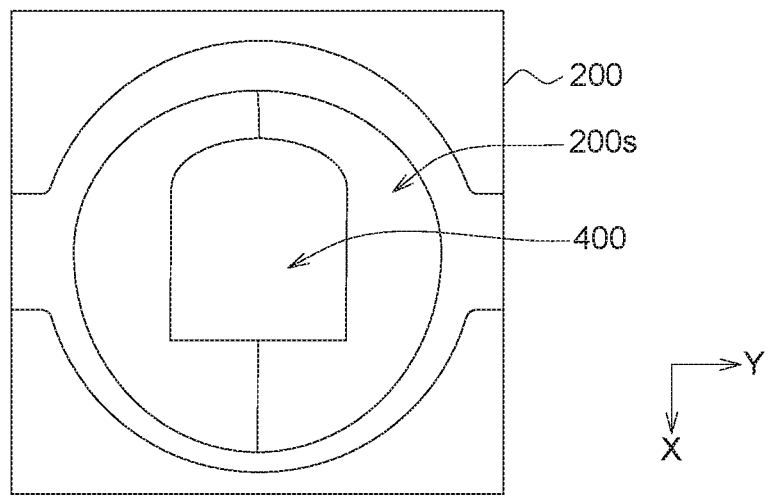
FIGS. 2A-2B show some 3D diagrams of a housing according to an embodiment of the present disclosure.
Figure 2B:
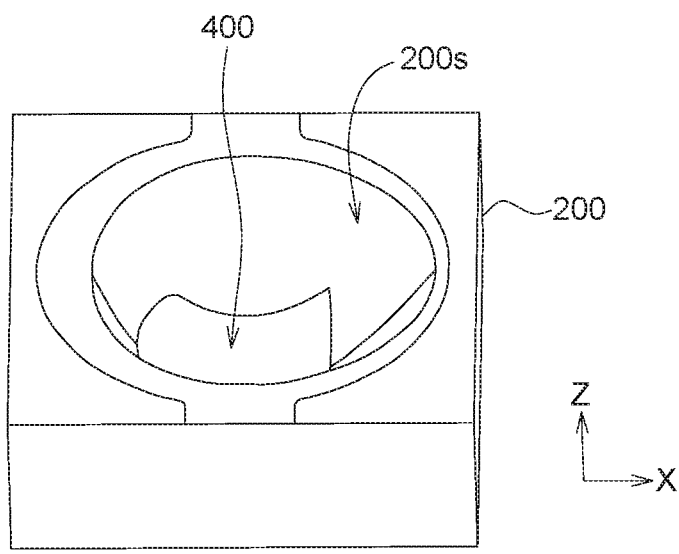
Figure 3A:
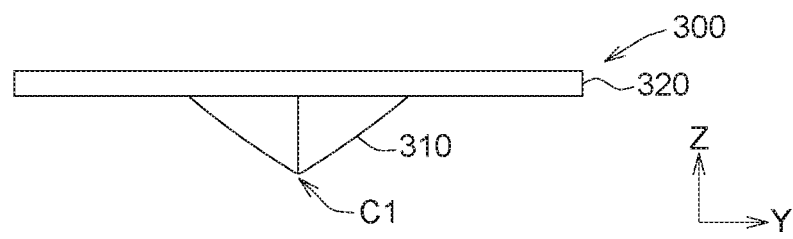
FIGS. 3A-3C show some 3D diagrams of a lens structure according to an embodiment of the present disclosure.
Figure 3B:
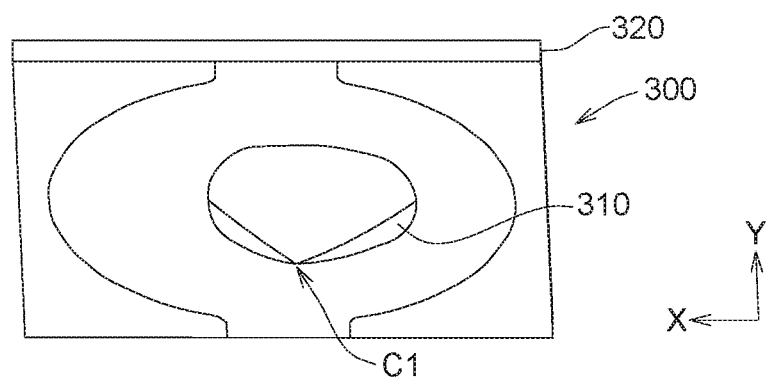
Figure 3C:
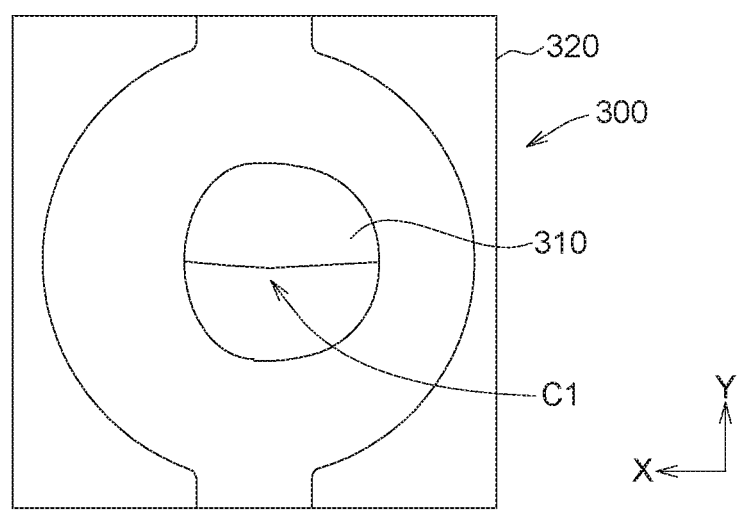

FIG. 1 shows a top view of a light emitting control system according to an embodiment of the present disclosure, FIG. 1A shows a cross-sectional view along a first cross-sectional line 1A-1A' in FIG. 1, FIG. 1B shows a cross-sectional view along a second cross-sectional line 1B-1B' in FIG. 1, FIGS. 1C-1D show 3D explosion diagrams of a light emitting control system as viewed from different perspectives according to an embodiment of the present disclosure, FIGS. 2A-2B show some 3D diagrams of a housing according to an embodiment of the present disclosure, and FIGS. 3A-3C show some 3D diagrams of a lens structure according to an embodiment of the present disclosure. In the present disclosure, the light emitting control system involves IRIS recognition, and particularly involves IRIS recognition for off-axis design.

As shown in FIGS. 1 and 1A to 1D, a light emitting control system 10 includes an IR emitter 100 having a central axis A1, a housing 200 and a lens structure 300. The housing 200 has a reflective inner surface 200s defining a receiving space 400, and the lens structure 300 is disposed on the housing 200. As shown in FIG. 1A, a cross-sectional shape of the reflective inner surface 200s along the first cross-sectional line 1A-1A' is asymmetric with respect to the central axis A1 of the IR emitter 100, and the IR emitter 100 is disposed in the receiving space 400. As shown in FIGS. 1A-1D, the lens structure 300 includes a lens 310 facing the IR emitter 100, and a cross-sectional shape of the lens 310 along the first cross-sectional line 1A-1A' is asymmetric with respect to the central axis A1 of the IR emitter 100.

In the embodiments, as shown in FIG. 1B, the lens 310 and the reflective inner surface 200s of the housing 200 have symmetric shapes with respect to the central axis A1 of the IR emitter 100 along the second cross-sectional line 1B-1B', and as shown in FIG. 1, the second cross-sectional line 1B-1B' is perpendicular to the first cross-sectional line 1A-1A'.

According to the embodiments of the present disclosure, the design of the light emitting control system with an asymmetric structure along a cross-sectional view plays a significant role in the treatments of IR lights emitted from the IR emitter. As shown in FIGS. 1A-1B, lights L emitted out of the lens structure 300 may be guided and/or tilted according to the asymmetric structural design of the lens 310 and the housing 200. Detailed description will be discussed hereinafter.

In the embodiments, as shown in FIGS. 1A-1D and 2A-2B, the receiving space 400 of the housing 200 may be surrounded by the reflective inner surface 200s with a top opening toward the lens structure 300 and a bottom opening where the IR emitter 100 is located.

In the embodiments, as shown in FIGS. 1A-1D and 3A-3C, the lens structure 300 may include a lens body 320 with the lens 310 formed on the lens body 320, and the lens 310 may have an aspherical surface. The lens body 320 has an extended edge to be mounted on the housing 200, the lens body 320 and the lens 310 are formed of the same material, preferably a transparent material, and the lens 310 is located within the receiving space 400. As shown in FIG. 1A, a central point C1 of the lens 310 is offset laterally from the central axis A1 of the IR emitter 100 along the first cross-sectional line 1A-1A'.

Figure 4:
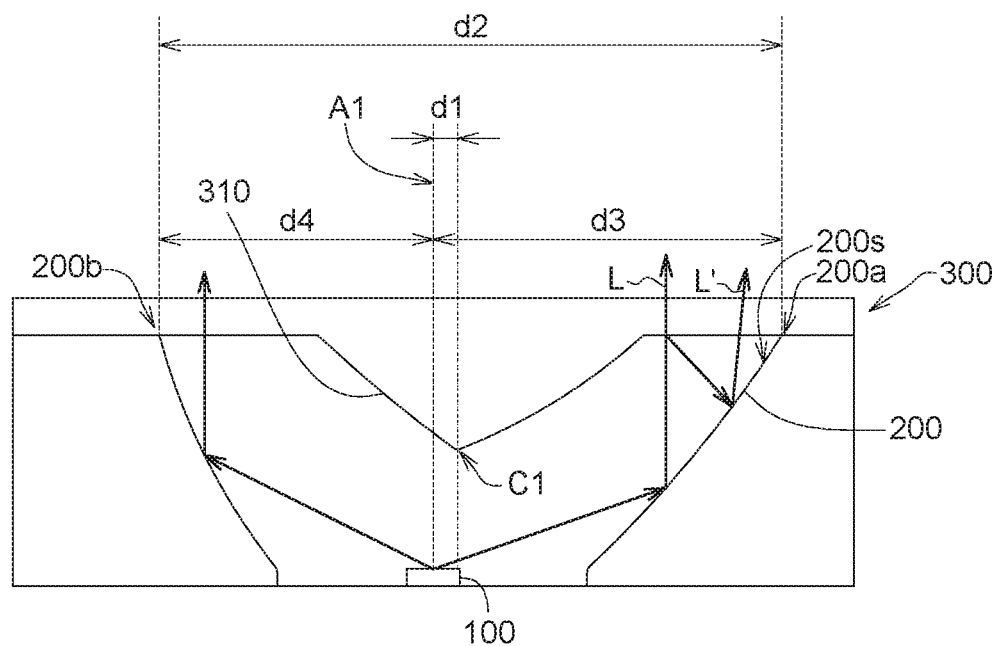
FIG. 4 shows a schematic drawing of light paths of the light emitting control system along the first cross-sectional line 1A-1A' according to an embodiment of the present disclosure.

FIG. 4 shows a schematic drawing of light paths of the light emitting control system along the first cross-sectional line 1A-1A' according to an embodiment of the present disclosure. As shown in FIG. 4, on the more inclined side of the reflective inner surface 200s of the housing 200, lights L' (e.g. IR lights) may be recycled (which only happens when the lens 310 and the lens body 320 are formed of a transparent material).

With the design of the present disclosure, referring to FIGS. 1A-1B and 4, some of the lights L emitted from the IR emitter 100 directly pass through air in the receiving space 400 and then the lens 310 to be collimated, and some of the lights L' emitted from the IR emitter 100 pass through air, are reflected by the reflective inner surface 200s of the housing 200 and then emit out of the light emitting control system. In other words, the lights emitted from the IR emitter 100 are divided into two groups and are treated differently. As such, the lights, after divided into two groups and treated in two different ways, emitted out of the light emitting control system can have uniform light pattern among a relative large view angle with a relatively high light intensity. For example, referring to FIG. 4, when the condition of lights L' being recycled is considered, about 48% of the lights are treated/controlled by the housing 200, and about 52% of the lights are treated/controlled by the lens 310. Alternatively, when assuming no light is recycled, about 41% of the lights are treated/controlled by the housing 200, and about 59% of the lights are treated/controlled by the lens 310.

In some embodiments, as shown in FIG. 4, the central point C1 of the lens 310 is offset laterally from the central axis A1 of the IR emitter 100 (e.g. the optical axis of the IR emitter 100) along the first cross-sectional line 1A-1A' by a distance d1 of such as 0.1 mm-0.3 mm.

In some embodiments, as shown in FIG. 4, the central point C1 of the lens 310 is offset laterally from the central axis A1 along the first cross-sectional line 1A-1A' by an offset distance d1, two top edges 200a and 200b of the reflective inner surface 200s of the housing 200 along the first cross-sectional line 1A-1A' are separated by a first distance d2, and a ratio (d1/d2) defined by the offset distance d1 divided by the first distance d2 is about 3%-12%.

In some embodiments, as shown in FIGS. 1A-1D and 4, the lens 310 may have a conical shape with an apex, which is the center point C1. The central point C1 (i.e. the apex) of the lens 310 may be offset laterally from the central axis A1 along the first cross-sectional line 1A-1A' toward the more inclined side by an offset distance d1 of 0.1 mm-0.3 mm, an offset ratio (d1/d3) defined by the offset distance d1 divided by a distance d3 from the central axis A1 to the top edge 200a is about 6%-21%, an offset ratio (d1/d4) defined by the offset distance d1 divided by a distance d4 from the central axis A1 to the top edge 200b is about 8%-27%, and the offset ratio (d1/d2) with respect to the overall structure is about 3%-12%.

In one embodiment, the distance d3 is about 1.45 mm, the distance d4 is about 1.14 mm, and accordingly, in the present embodiment, an offset ratio with respect to the less inclined half side is 0.1/1.14=8.77%, an offset ratio with respect to the more inclined half side is 0.1/1.45=6.89%, and an offset ratio with respect to the overall structure is 0.1/(1.14+1.45) =3.86%. In another embodiment, the offset distance d1 is about 0.2 mm, an offset ratio with respect to the less inclined half side is 0.2/1.14=17.5%, an offset ratio with respect to the more inclined half side is 0.2/1.45=13.7%, and an offset ratio with respect to the overall structure is 0.2/(1.14+1.45) =7.7%. In an additional embodiment, the offset distance d1 is about 0.3 mm, an offset ratio with respect to the less inclined half side is 0.3/1.14=26.3%, an offset ratio with respect to the more inclined half side is 0.3/1.45=20.6%, and an offset ratio with respect to the overall structure is 0.3/ (1.14+1.45)=11.5%. It is to be noted that the above ratios are for exemplary only, and the present disclosure is not limited thereto.

Figure 5A:
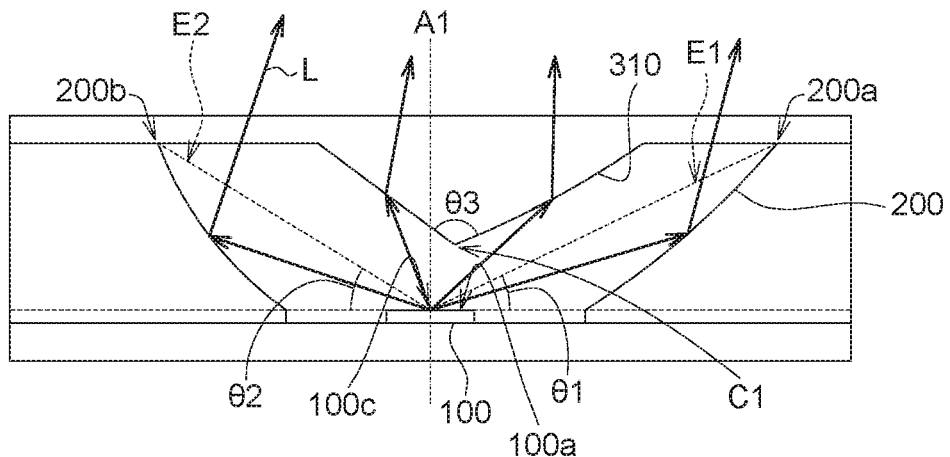
FIGS. 5A-5B show schematic drawings of light paths of the light emitting control system along the first cross-sectional line 1A-1A' and the second cross-sectional line 1B-1B' respectively according to an embodiment of the present disclosure.
Figure 5B:
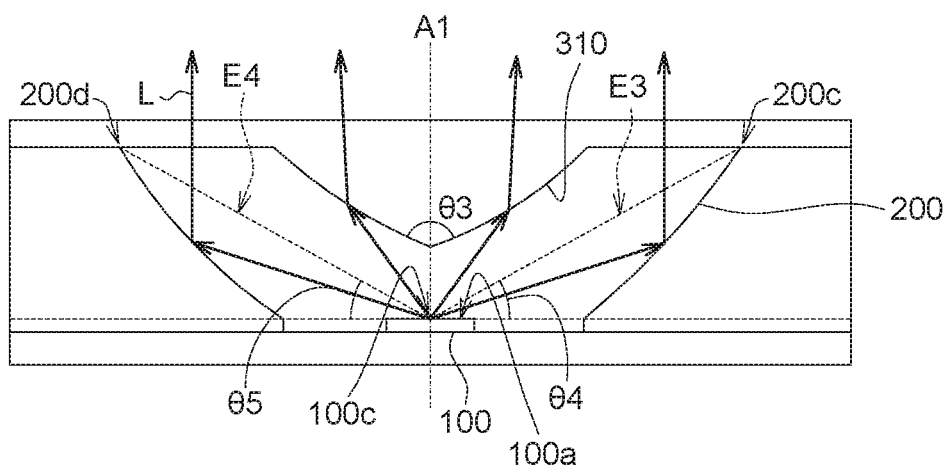

FIGS. 5A-5B show schematic drawings of light paths of the light emitting control system along the first cross-sectional line 1A-1A' and the second cross-sectional line 1B-1B' respectively according to an embodiment of the present disclosure. In FIGS. 5A-5B, how the lights emitted from the IR emitter 100 can be treated/controlled independently by the housing 200 and the lens 310 are shown.

As shown in FIG. 5A, the reflective inner surface 200s of the housing 200 has a first top edge 200a and a second top edge 200b along the first cross-sectional line 1A-1A', a top surface 100a of the IR emitter 100 and two extension lines E1 and E2 extending from a center point 100c of the IR emitter 100 respectively to the first top edge 200a and the second top edge 200b form a first included angle θ1 and a second included angle θ2 respectively, and the second included angle θ2 is larger than the first included angle θ1 by at least 5°.

In the embodiments, the first included angle θ1 may range from 10° to 35°, and the second included angle θ2 may range from 20° to 42°.

In the embodiments, as shown in FIG. 5A, the central point C1 of the lens 310 is offset laterally from the central axis A1 of the IR emitter 100 toward the first top edge 200a.

In the embodiments, as shown in FIG. 5A, the lens 310 has a conical shape with an apex (i.e. the central point C1), and an apex angle θ3 of the lens 310 may range from 50° to 100°.

As shown in FIG. 5A, the housing 200 and the lens 310 control the lights independently. The housing 200 controls the lights L to be collimated by adjusting the first included angle θ1 and the second included angle θ2. The lens 310 controls the lights L to be collimated (and tilted) by adjusting the apex angle θ3. The apex of the first included angle θ1 and the second included angle θ2 is the same point and located at the center point 100c on the top surface 100a of the IR emitter 100. The apex of the apex angle θ3 is the protruded apex (i.e. the central point C1) of the conical-shaped lens 310.

As shown in FIG. 5B, in the symmetric cross-sectional view, the reflective inner surface 200s of the housing 200 has two top edges 200c and 200d along the second cross-sectional line 1B-1B', the top surface 100a of the IR emitter 100 and two extension lines E3 and E4 extending from the center point 100c of the IR emitter 100 respectively to the two top edge 200c and 200d form two included angles θ4 and θ5 respectively. The apex angle θ3 of the lens 310 ranges from about 50° to 100°, the two included angles θ4 and θ5 are about the same, and the two included angles θ4 and θ5 range from about 10° to 40°.

In one embodiment, in the symmetric cross-sectional view, the apex angle θ3 is 100°, and the included angles θ4 and θ5 are both 37°; in the asymmetric cross-sectional view, the apex angle θ3 is 100°, the first included angle θ1 is 41°, and the second included angle θ2 is 34°. In another embodiment, in the symmetric cross-sectional view, the apex angle θ3 is 100°, and the included angles θ4 and θ5 are both 33°; in the asymmetric cross-sectional view, the apex angle θ3 is 100°, the first included angle θ1 is 36°, and the second included angle θ2 is 31°. In a further embodiment, in the symmetric cross-sectional view, the apex angle θ3 is 100°, and included angles θ4 and θ5 are both 35°; in the asymmetric cross-sectional view, the apex angle θ3 is 100°, the first included angle θ1 is 38°, and the second included angle θ2 is 30°. It is to be noted that the above angles are for exemplary only, and the present disclosure is not limited thereto.

Figure 6A:
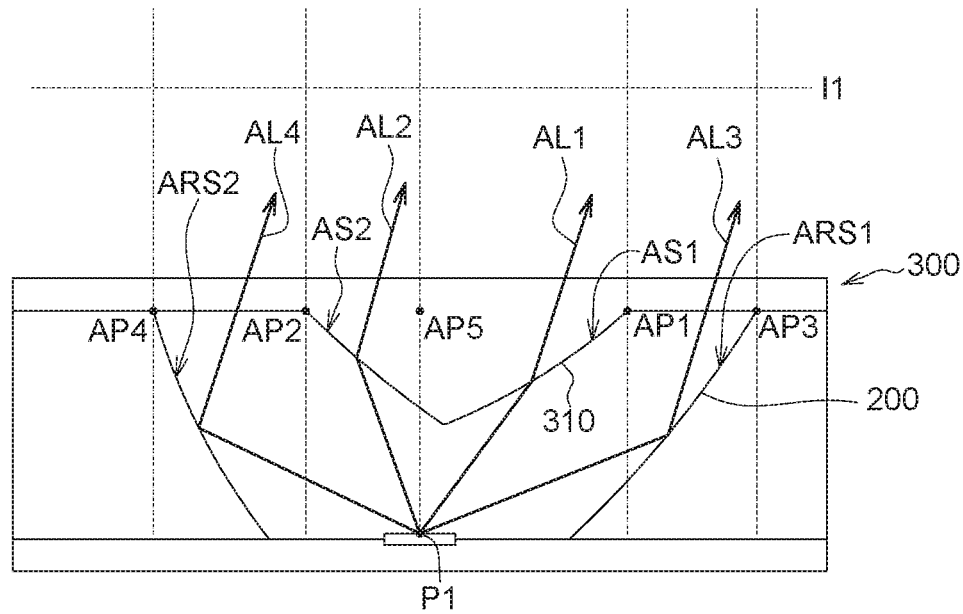
FIGS. 6A-6B show schematic drawings of light paths and tilted beam angles of emitted lights of the light emitting control system along the first cross-sectional line 1A-1A' and the second cross-sectional line 1B-1B' respectively according to another embodiment of the present disclosure.
Figure 6B:
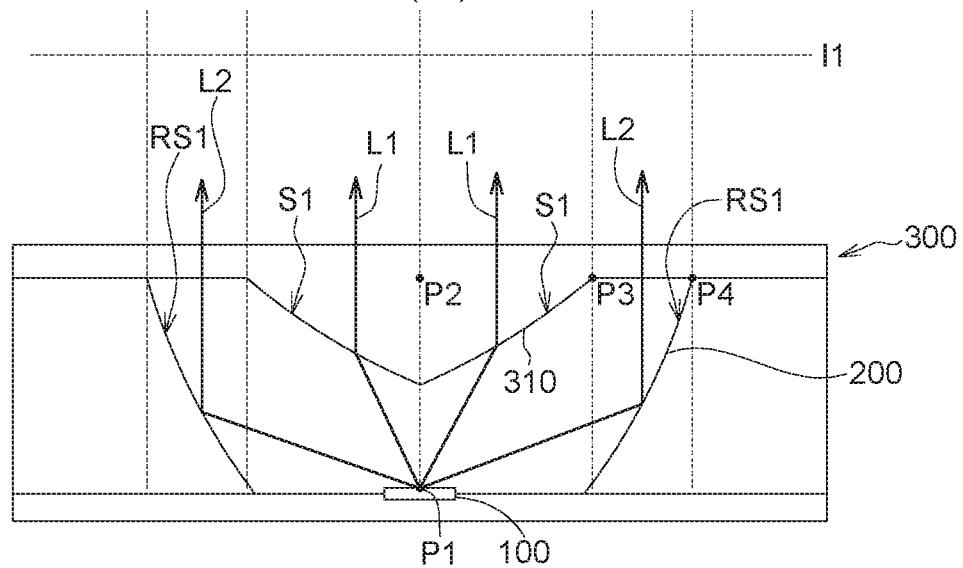

FIGS. 6A-6B show schematic drawings of light paths and tilted beam angles of emitted lights of the light emitting control system along the first cross-sectional line 1A-1A' and the second cross-sectional line 1B-1B' respectively according to another embodiment of the present disclosure. In FIGS. 6A-6B, surface 11 refers to the surface where a human face is illuminated.

In FIG. 6B, the two curved surfaces S1 are the cross-sectional surfaces of the lens 310 and are symmetrical with respect to the optical axis V1 (i.e. the central axis A1) of the IR emitter 100, and the two curved surface RS1 are cross-sections of the reflective inner surface 200s and are symmetrical with respect to the optical axis V1.

As shown in FIG. 6B, the IR light L1 is emitted by the IR emitter 100 at the location P1, passes through and is refracted by the curved surface S1, and then is emitted out of the structure at the region defined by the range from location P2 to location P3. The emitted IR light L1 is preferably vertical to the light emitting surface, which is defined as having an emitting angle of 0°; in some embodiments, the emitting angle of the emitted IR light L1 may be 0° to 5°.

As shown in FIG. 6B, the IR light L2 is emitted by the IR emitter 100 at the location P1, passes through and is refracted by the curved surface RS1, and then is emitted out of the structure at the region defined by the range from location P3 to location P4. The emitted IR light L2 is preferably vertical to the light emitting surface, which is defined as having an emitting angle of 0°; in some embodiments, the emitting angle of the emitted IR light L2 may be 0° to 3°.

In FIG. 6A, the two curved surfaces AS1 and AS2 are the cross-sectional surfaces of the lens 310 and are asymmetrical with respect to the optical axis V1, and the two curved surface ARS1 and ARS2 are cross-sections of the reflective inner surface 200s and are asymmetrical with respect to the optical axis V1. An emitted light with an emitting direction which is vertical to the light emitting surface is defined as having an emitting angle of 0°.

As shown in FIG. 6A, the IR light AL1 is emitted by the IR emitter 100 at the location P1, passes through and is refracted by the curved surface AS1, and then is emitted out of the structure at the region defined by the range from location AP5 to location AP1. The emitting angle of the emitted IR light AL1 is 0° to 12°. In some embodiments, the emitted IR light AL1 has a maximum energy at the emitting angle of 8°; that is, most of the emitted IR light AL1 at the region defined by the range from location AP5 to location AP1 is tilted by 8°.

As shown in FIG. 6A, the IR light AL3 is emitted by the IR emitter 100 at the location P1, passes through and is refracted by the curved surface ARS1, and then is emitted out of the structure at the region defined by the range from location AP1 to location AP3. The emitting angle of the emitted IR light AL3 is 5° to 12°. In some embodiments, the emitted IR light AL1 has a maximum energy at the emitting angle of 8°; that is, most of the emitted IR light AL3 at the region defined by the range from location AP1 to location AP3 is tilted by 8°.

As shown in FIG. 6A, the IR light AL2 is emitted by the IR emitter 100 at the location P1, passes through and is refracted by the curved surface AS2, and then is emitted out of the structure at the region defined by the range from location AP5 to location AP2. The emitting angle of the emitted IR light AL2 is 0° to 12°. In some embodiments, the emitted IR light AL2 has a maximum energy at the emitting angle of 8°; that is, most of the emitted IR light AL2 at the region defined by the range from location AP5 to location AP2 is tilted by 8°.

As shown in FIG. 6A, the IR light AL4 is emitted by the IR emitter 100 at the location P1, passes through and is refracted by the curved surface ARS2, and then is emitted out of the structure at the region defined by the range from location AP2 to location AP4. The emitting angle of the emitted IR light AL4 is 5° to 12°. In some embodiments, the emitted IR light AL4 has a maximum energy at the emitting angle of 8°; that is, most of the emitted IR light AL4 at the region defined by the range from location AP2 to location AP4 is tilted by 8°.

Figure 7:
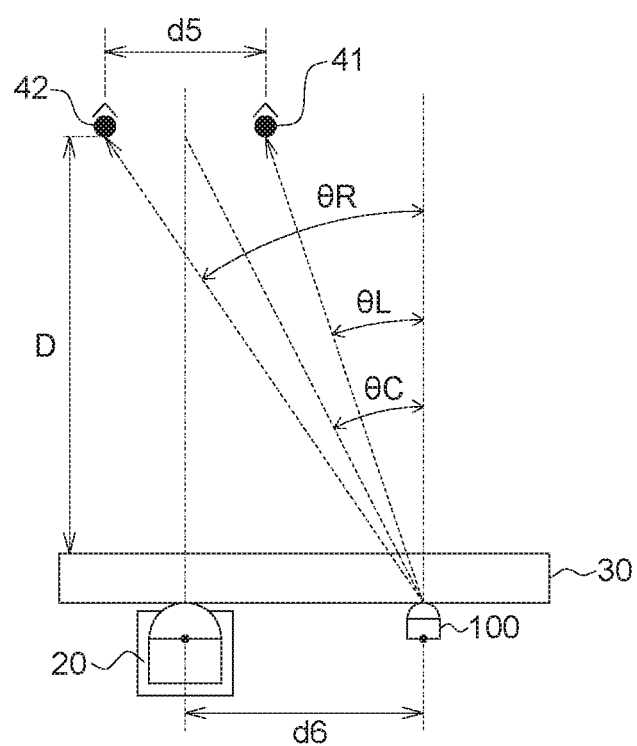
FIG. 7 shows an off-axis design using a light pattern tilted IR emitter for tilted beam angle(s) and view angles (half angles) applying the light emitting control system according an embodiment of the present disclosure.

FIG. 7 shows an off-axis design using a light pattern tilted IR emitter for tilted beam angle(s) and view angles (half angles) applying the light emitting control system according an embodiment of the present disclosure. As shown in FIG. 7, in an embodiment, a pupil distance d5 may be for example 7 cm, and a distance d6 between the IR emitter 100 and an IR camera 20 located in the center of the device (e.g. a mobile phone), may be for example 3.92 cm. By applying the light emitting control system of the present disclosure, an off-axis design using the light pattern tilted IR emitter can be achieved, and a view angle of only about ±15°, preferably about ±13°, can illuminate both eyes. In such way, a relative high radiant intensity (mW/sr) with high light utilization can be obtained, and drawbacks of low radiant intensity and half energy being wasted can be prevented.

In addition, the following table 1 shows the information regarding the pupil distances of American males and females at ages of 5 and 95 and the viewing angles under various conditions. "D" refers to the distance between the front panel 30 (where the IR camera 20 and the IR emitter 100 are located) and the eyes 41 and 42, θR is a half angle starting from the right eye 42, θL is a half angle starting from the left eye 41, and θC is a half angle starting from the center between the right eye 42 and the left eye 41.

TABLE 1

| | pupil distances at age of 5 (cm) | | | pupil distances at age of 95 (cm) | | |
|---|---|---|---|---|---|---|
| Male | 5.5 | | | 7 | | |
| Female | 5.3 | | | 6.5 | | |
| | D = 20 cm | | | D = 40 cm | | |
| | θL(cm) | θR(cm) | θC(cm) | θL(cm) | θR(cm) | θC(cm) |
| Male | 1.2 | 20 | 10.6 | 3.6 | 18 | 10.8 |
| Female | 0.6 | 10.5 | 5.55 | 1.8 | 9.3 | 5.55 |

As shown in FIG. 7, in some embodiments, a tilted beam angle of about 8° and view angles (half angles) of about ±13° may provide a better solution for a more flexible module design (the distance d6 between the IR emitter 100 and an IR camera 20 ranges from 1.75 cm to 4.17 cm). With the design provided by the present disclosure described hereinafter, the above conditions of a tilted beam angle of about 8° and view angles (half angles) of about ±13° can be satisfied.

Figure 8A:
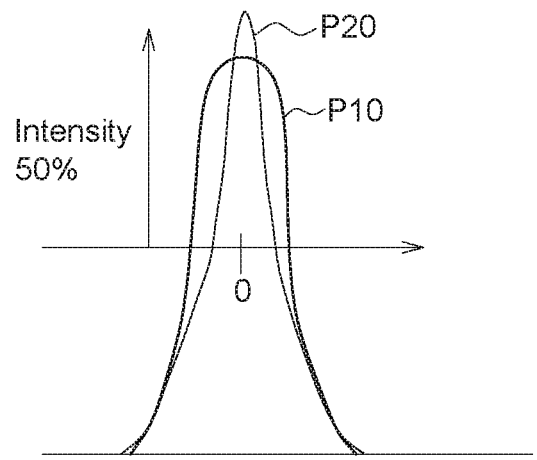
FIG. 8A shows a comparison of light patterns.
Figure 8B:
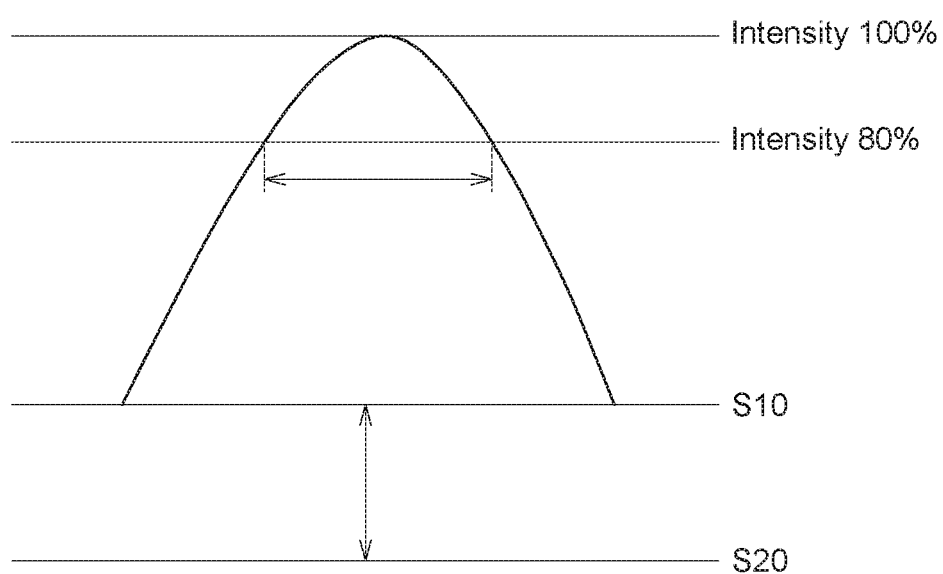
FIG. 8B shows an enlarged schematic drawing of the light pattern according to the embodiments of the present disclosure.

In addition, with the design provided by the present disclosure, a uniform light pattern with relatively high light intensity can be achieved. FIG. 8A shows a comparison of light patterns, and FIG. 8B shows an enlarged schematic drawing of the light pattern according to the embodiments of the present disclosure.

In FIG. 8A, x-axis represents "view angle" with 0° indicated corresponding to the central location of the light patterns. While a conventional light pattern P20 shows a peak with very high light intensity corresponding to a view angle of 0°, only a very small range of view angle is covered by the high-intensity light. In contrast, with the design provided by the present disclosure, the light pattern P10 has a uniform light intensity distribution among a relatively large range of view angle (about at least three times the view angle range of the conventional light pattern), and a relative high light intensity can be maintained within the relatively large range of view angle. For example, as shown in FIG. 8B, the surface S10 refers to the surface where a human face is illuminated, and the surface S20 refers to the light emitting surface, e.g. the surface of an IR emitter 100. As shown in FIG. 8B, when the distance between the surface S10 and the surface S20 is about 200 mm-400 mm, which is about the length of a human arm, the energy distribution of the projected light pattern has a width of about 20 mm-30 mm at the light intensity of 80%. In other words, there is a range of about 20 mm-30 mm, which is about the range covering two eyes, on the human face with a light intensity of about up to 80%.

Figure 9A:
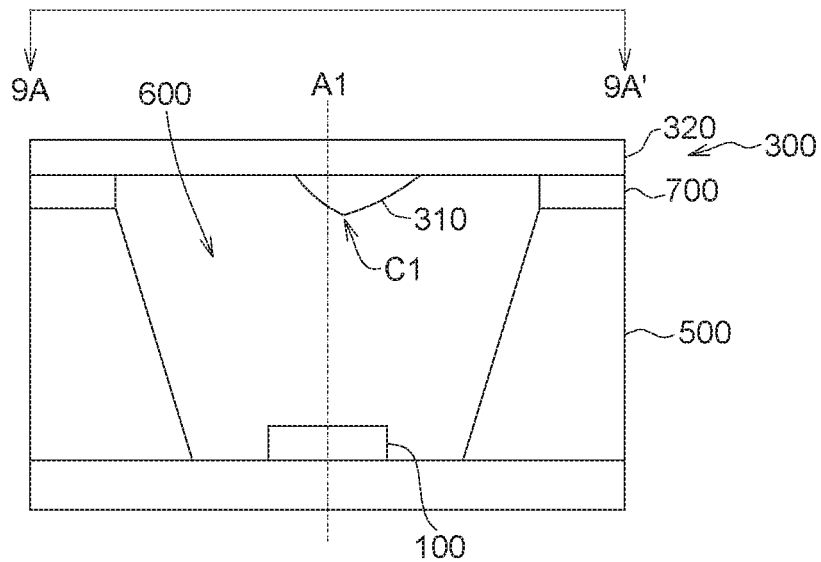
FIG. 9A shows a schematic view of a light emitting control system according to an additional embodiment of the present disclosure.
Figure 9B:
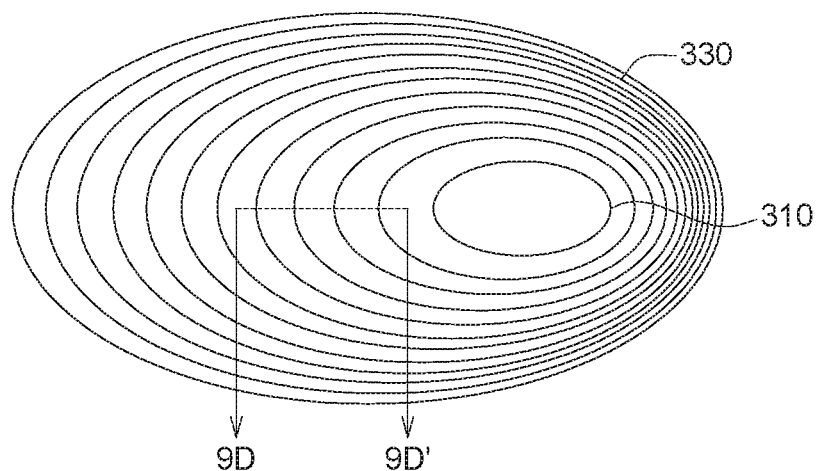
FIG. 9B shows a top view of a lens structure as viewed from a bottom-up perspective according to an additional embodiment of the present disclosure.
Figure 9C:
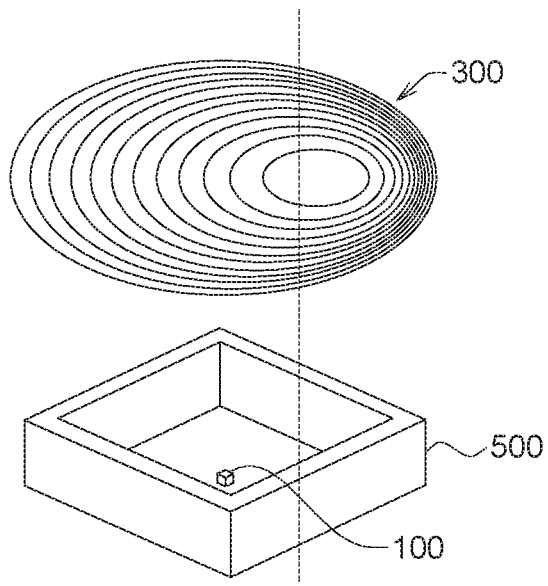
FIG. 9C shows an explosion diagram of a light emitting control system according to an additional embodiment of the present disclosure.
Figure 9D:
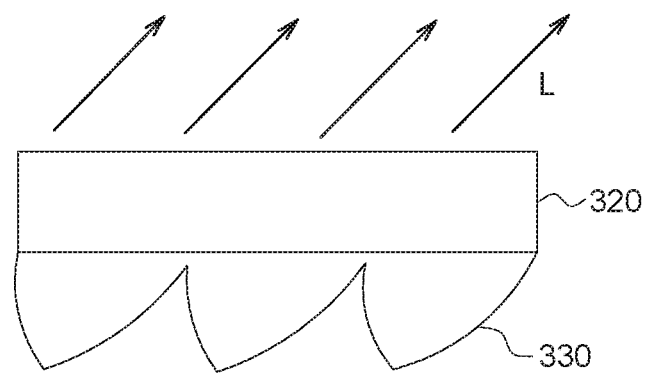
FIG. 9D shows a cross-sectional view along the cross-sectional line 9D-9D' in FIG. 9B.

FIG. 9A shows a schematic view of a light emitting control system according to an additional embodiment of the present disclosure, FIG. 9B shows a top view of a lens structure as viewed from a bottom-up perspective according to an additional embodiment of the present disclosure, FIG. 9C shows an explosion diagram of a light emitting control system according to an additional embodiment of the present disclosure, FIG. 9D shows a cross-sectional view along the cross-sectional line 9D-9D' in FIG. 9B, and FIGS. 10A-10C show some 3D diagrams of a lens structure according to an additional embodiment of the present disclosure.

As shown in FIGS. 9A-9D, the light emitting control system 60 includes a housing 500, an IR emitter 100 and a lens structure 300. The housing 500 has a receiving space 600, the IR emitter 100 has a central axis A1 and is disposed in the receiving space 600 of the housing 500. The lens structure 300 is disposed on the housing 500. The lens structure 300 includes a lens 310 facing the IR emitter 100, and a cross-sectional shape of the lens 310 along a first cross-sectional line 9A-9A', which is parallel to the cross-sectional line 9D-9D' as indicated in FIG. 9B, is asymmetric with respect to the central axis A1 of the IR emitter 100.

Figure 10A:
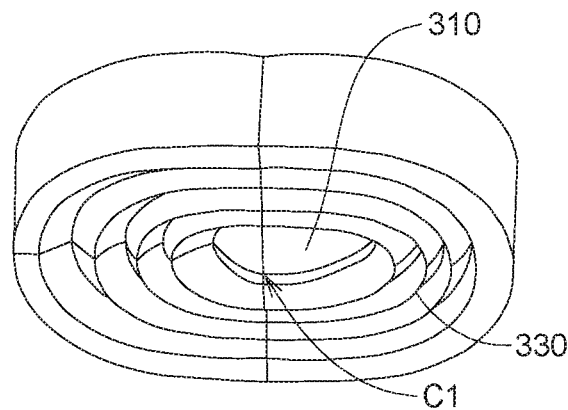
FIGS. 10A-10C show some 3D diagrams of a lens structure according to an additional embodiment of the present disclosure.
Figure 10B:
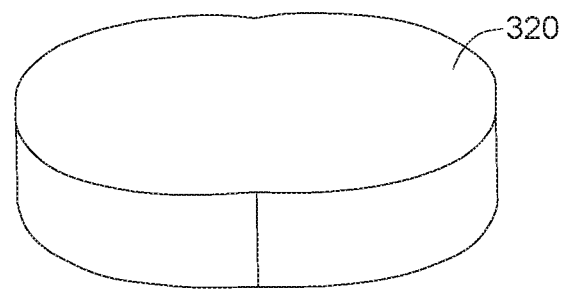
Figure 10C:
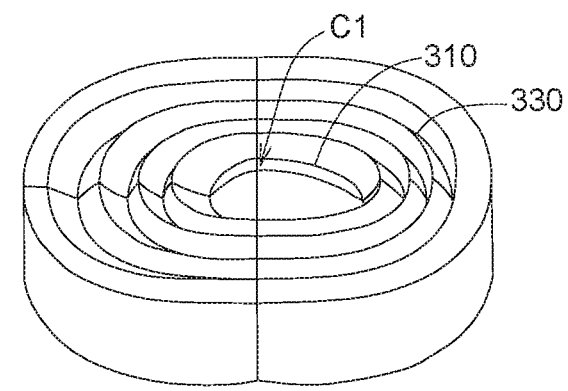

As shown in FIGS. 9A, 10A and 10C, a central point C1 of the lens 310 is offset laterally from the central axis A1 along the first cross-sectional line 9A-9A'.

As shown in FIGS. 9B-9D, the lens structure 300 may further include a plurality of circular ribs 330 facing the IR emitter 100, the circular ribs 330 surround the lens 310, and each of the circular ribs 330 has two curved side surfaces.

According to some embodiments of the present disclosure, the lens 310 of the present embodiment may have the same asymmetric structural design as that of the lens 310 disclosed in previous embodiments. In the embodiments, a number of the circular ribs 330 may range from 3 to 10.

As shown in FIG. 9D, a cross-sectional shape of the circular ribs 330 along the cross-sectional line 9D-9D' is asymmetric with respect to the central axis A1 of the IR emitter 100.

In some embodiments, the housing 500 may be made of a resin material, for example, such as PLCC or EMC, and does not necessarily have reflective surfaces, such that the manufacturing process is simplified, and the costs are reduced. Emitted IR lights can have a tilted beam angle of about 8° while still achieving uniform light pattern among a relative large view angle range with a relatively high light intensity by the asymmetric design of the lens structure 300 having the lens 310, the lens body 320 and the circular ribs 330.

In some other embodiments, an inner surface of the receiving space 600 of the housing 500 may be reflective as well.

Figure 11:
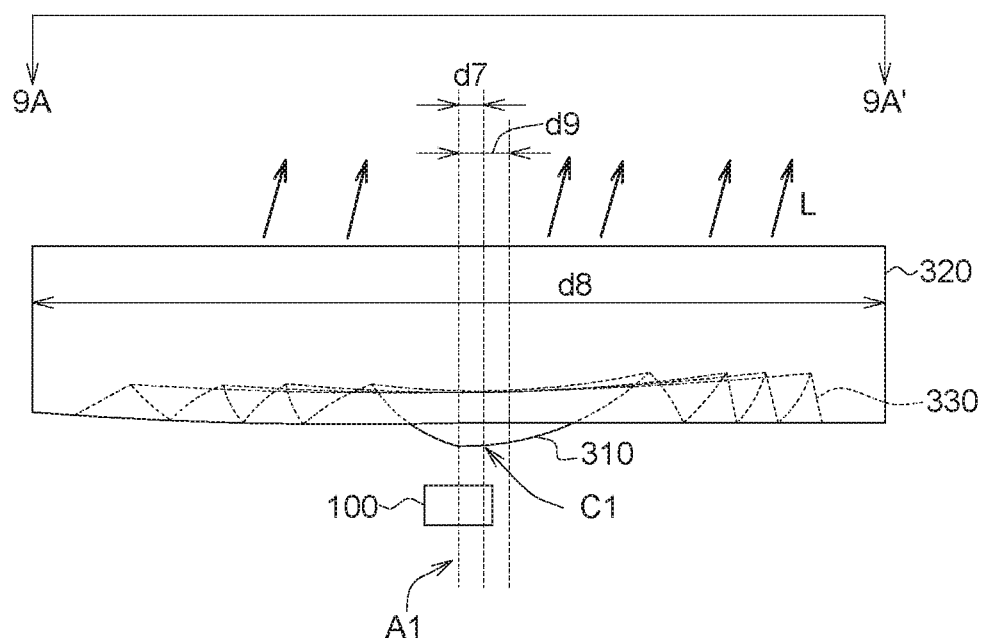
FIG. 11 shows a schematic drawing of light paths of the light emitting control system along the first cross-sectional line 9A-9A' according to an additional embodiment of the present disclosure.

FIG. 11 shows a schematic drawing of light paths of the light emitting control system along the first cross-sectional line 9A-9A' according to an additional embodiment of the present disclosure.

As shown in FIG. 11, in one embodiment, the central axis A1 of the IR emitter 100 is located at a center of the housing 500, the central point C1 of the lens 310 is offset laterally from the central axis A1 (i.e. the center of the housing 500) along the first cross-sectional line 9A-9A' by an offset distance d7, the lens structure 300 has a first length d8 along the first cross-sectional line 9A-9A', and a ratio defined by the offset distance d7 divided by the first length d8 is about 5%-12%.

As shown in FIG. 11, in an alternative embodiment, the central axis A1 of the IR emitter 100 is further offset laterally from the center of the housing 500, the central point C1 of the lens 310 is offset laterally from the central axis A1 and the center of the housing 500 along the first cross-sectional line 9A-9A' by an offset distance d9, which is the total distance of the central point C1 of the lens 310 offset from the center of the housing. The lens structure 300 has a first length d8 along the first cross-sectional line 9A-9A', and a ratio defined by the offset distance d9 divided by the first length d8 is about 11%-18%.

As shown in FIG. 11, when the central axis A1 of the IR emitter 100 is located at a center of the housing 500, the offset ratio with respect to the overall structure may be 5-12%. For example, in one embodiment as shown in FIG. 11, when the first length d8 is 3.5 cm, the offset distance d7 is 0.3 cm, and the offset ratio with respect to the overall structure is preferably 0.3/3.5=8.5%; in another embodiment, the offset ratio with respect to the overall structure is 0.2/3.5=5.7% when the offset distance d7 is 2 cm; in an additional embodiment, the offset ratio with respect to the overall structure is preferably 0.4/3.5=11.4% when the offset distance d7 is 4 cm.

As shown in FIG. 11, in some other embodiments, when the central axis A1 of the IR emitter 100 is further offset from the center of the housing 500 by about 0.1-0.3 mm, and the offset ratio with respect to the overall structure may be 11-18%. For example, in one embodiment as shown in FIG. 11, assuming that the central point C1 is offset from the central axis A1 by 0.3 cm, when the central axis A1 of the IR emitter 100 is further offset from the center of the housing 500 by about 0.2 mm, the offset ratio with respect to the overall structure is preferably (0.3+0.2)/3.5=14.28%; in another embodiment, when the central axis A1 of the IR emitter 100 is further offset from the center of the housing 500 by about 0.1 mm, the offset ratio with respect to the overall structure is (0.3+0.1)/3.5=11.4%; in an additional embodiment, when the central axis A1 of the IR emitter 100 is further offset from the center of the housing 500 by about 0.3 mm, the offset ratio with respect to the overall structure is preferably (0.3+0.3)/3.5=17.1%. It is to be noted that the above ratios are for exemplary only, and the present disclosure is not limited thereto.

In some embodiments of the present disclosure, an image recognition camera is provided. The image recognition camera includes the aforementioned light emitting control system.

In some embodiments of the present disclosure, a mobile terminal is provided. The mobile terminal includes the aforementioned image recognition camera.

While the disclosure has been described by way of example and in terms of the preferred embodiment(s), it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A light emitting control system, comprising:
   a housing having a receiving space;
   an IR emitter having a central axis disposed in the receiving space of the housing; and
   a lens structure disposed on the housing, wherein the lens structure comprises a lens having an inner surface facing the IR emitter, and a cross-sectional shape of the inner surface of the lens along a first cross-sectional line is asymmetric with respect to the central axis of the IR emitter.

2. The light emitting control system according to claim 1, wherein the housing has a reflective inner surface defining the receiving space, and a cross-sectional shape of the reflective inner surface along the first cross-sectional line is asymmetric with respect to the central axis of the IR emitter.

3. The light emitting control system according to claim 2, wherein a central point of the lens is offset laterally from the central axis of the IR emitter along the first cross-sectional line.

4. The light emitting control system according to claim 3, wherein the central point of the lens is offset laterally from the central axis of the IR emitter along the first cross-sectional line by 0.1 mm-0.3 mm.

5. The light emitting control system according to claim 3, wherein the central point of the lens is offset laterally from the central axis along the first cross-sectional line by an offset distance, two top edges of the reflective inner surface along the first cross-sectional line are separated by a first distance, and a ratio defined by the offset distance divided by the first distance is 3%-12%.

6. The light emitting control system according to claim 2, wherein the lens and the reflective inner surface have symmetric shapes with respect to the central axis of the IR emitter along a second cross-sectional line, and the second cross-sectional line is perpendicular to the first cross-sectional line.

7. The light emitting control system according to claim 2, wherein the reflective inner surface has a first top edge and a second top edge along the first cross-sectional line, a top surface of the IR emitter and two extension lines extending from a center point of the IR emitter respectively to the first top edge and the second top edge form a first included angle and a second included angle respectively, and the second included angle is larger than the first included angle by at least 5°.

8. The light emitting control system according to claim 7, wherein the first included angle ranges from 10° to 35°, and the second included angle ranges from 20° to 42°.

9. The light emitting control system according to claim 7, wherein a central point of the lens is offset laterally from the central axis of the IR emitter toward the first top edge.

10. The light emitting control system according to claim 2, wherein the lens has a conical shape with an apex, and an apex angle of the lens ranges from 50° to 100°.

11. The light emitting control system according to claim 1, wherein the lens structure further comprises a plurality of circular ribs facing the IR emitter, the circular ribs surround the lens, and each of the circular ribs has two curved side surfaces.

12. The light emitting control system according to claim 11, wherein a number of the circular ribs ranges from 3 to 10.

13. The light emitting control system according to claim 11, wherein a cross-sectional shape of the circular ribs along the first cross-sectional line is asymmetric with respect to the central axis of the IR emitter.

14. The light emitting control system according to claim 1, wherein a central point of the lens is offset laterally from the central axis along the first cross-sectional line by an offset distance, the lens structure has a first length along the first cross-sectional line, and a ratio defined by the offset distance divided by the first length is 5%-12%.

15. The light emitting control system according to claim 1, wherein the central axis of the IR emitter is offset laterally from a center of the housing, a central point of the lens is offset laterally from the central axis of the IR emitter and the center of the housing along the first cross-sectional line by an offset distance, the lens structure has a first length along the first cross-sectional line, and a ratio defined by the offset distance divided by the first length is 11%-18%.

16. The light emitting control system according to claim 1, wherein the housing is made of a resin material.

17. The light emitting control system according to claim 1, wherein an inner surface of the receiving space of the housing is reflective.

18. An image recognition camera, comprising a light emitting control system according to claim 1.

19. A mobile terminal, comprising an image recognition camera according to claim 18.

* * * * *